Sept. 8, 1970        K. M. BAIRD        3,528,028
GASEOUS LASER OF IMPROVED CONSTRUCTION
Filed Aug. 10, 1964        2 Sheets-Sheet 1
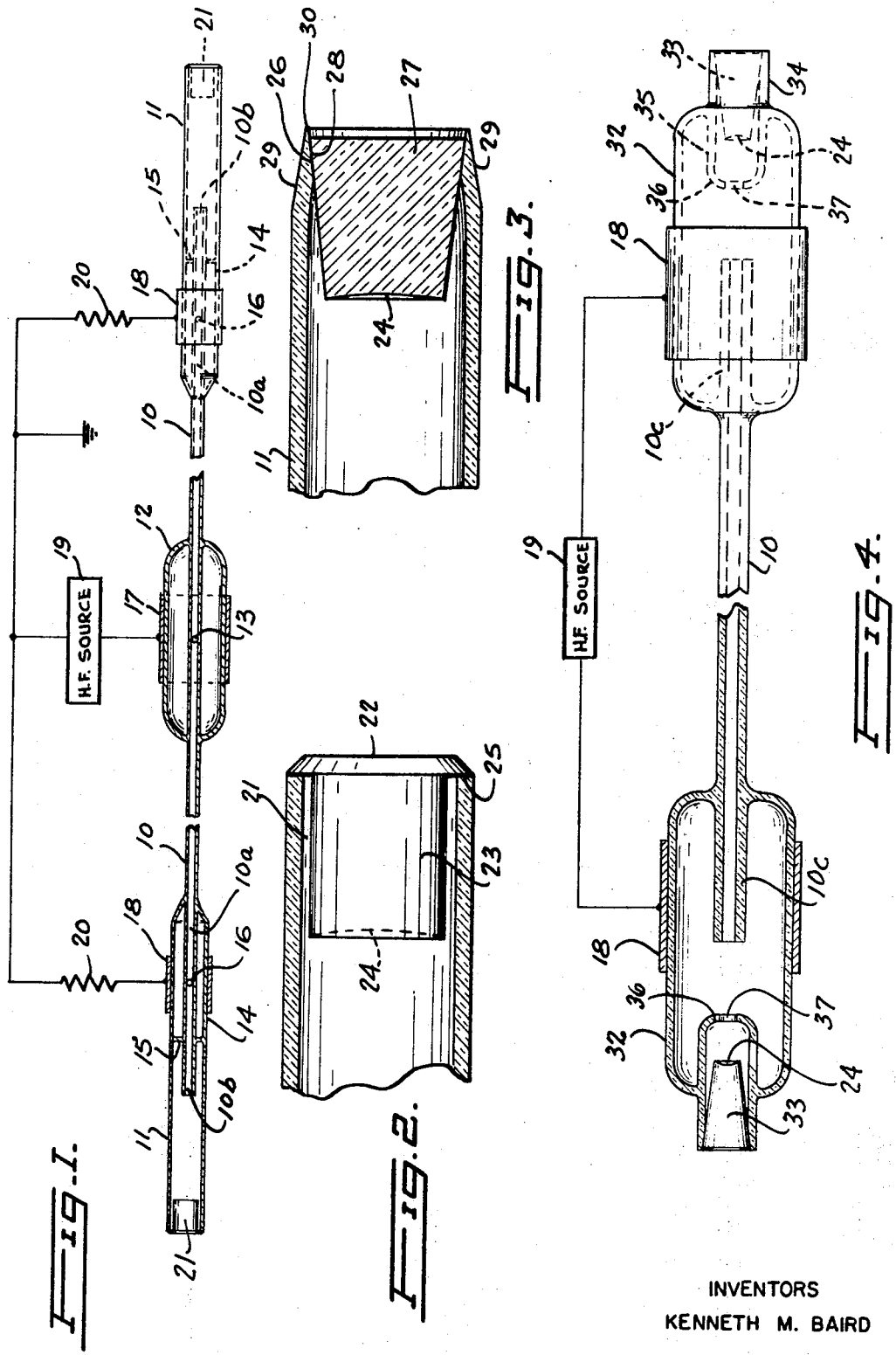
INVENTORS
KENNETH M. BAIRD

# United States Patent Office 3,528,028
Patented Sept. 8, 1970

3,528,028
GASEOUS LASER OF IMPROVED CONSTRUCTION
Kenneth M. Baird, Ottawa, Ontario, Canada, assignor to National Research Council, Ottawa, Ontario, Canada, a body corporate of Canada
Filed Aug. 10, 1964, Ser. No. 388,634
Claims priority, application Canada, Dec. 4, 1963, 890,474
Int. Cl. H01s 3/02, 3/05; H01j 11/02
U.S. Cl. 331—94.5                    1 Claim

ABSTRACT OF THE DISCLOSURE

A main laser tube is provided, in the regions where electrodes are to be arranged, with vacuum tight bulbs of larger diameter than the main tube, and the electrodes are placed around the exterior of such bulbs. Connections between the interior of the main tube and the interior of each of the bulbs are established by holes or interruptions in the wall of the main tube.

Each of the two end portions of the laser tube are closed by a plug which consists of a single piece and has a reflecting coating on its inner surface. To ensure alignment of the reflecting surfaces of the plugs and the longitudinal axis of the laser tube, each end portion of the laser and its associated plug interengage with complementary conical surfaces. Minor adjustments are made by slightly flexing the entire device when mounting on an external support.

---

This invention relates to improvements in the construction of gaseous lasers.

Constructions of a gaseous laser are illustrated in the accompanying drawings to demonstrate the various features of the invention, the broad scope of which is however determined by the appended calims.

In the drawings:

FIB. 1 is an overall side view of the laser partly sectioned;

FIG. 2 is an enlarged partly sectional view of one end of the laser of FIG. 1;

FIG. 3 is a view similar to FIG. 2 showing an alternative;

FIG. 4 is an overall side view of a second laser construction;

Figure 5:
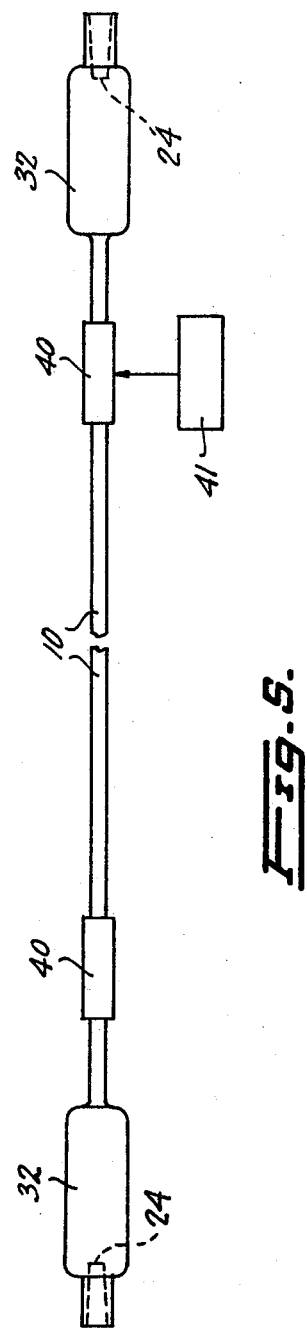

And FIG. 5 is an overall plan view of a laser construction according to FIG. 4, mounted on a support.

For conveniece, the dimensions of various parts of the laser will be mentioned as the text proceeds. These dimensions are provided to yield an indication of the orders of magnitude involved and the relative sizes of parts. The dimensions are not intended as expressing any limitation of the inventive features involved.

The main tube 10 in which the laser action takes place is a fused silica glass tube of 6 mm. outside diameter and a wall thickness of 1 mm. It has thus an inside diameter of 4 mm. This tube 10, including two enlarged end sections 11 (outside diameter 12 mm.) is approximately 40 cm. long. Centrally of the length of the tube 10 there is fused to it in a vacuum-tight manner a generally cylindrical fused silica glass bulb 12 having an external diameter of 25 mm. and also a wall thickness of 1 mm. A hole 13 formed in the tube 10 provides means for communication between the interior of the bulb 12 outside the tube 10 and the interior of the tube 10 itself.

In a like manner, similar bulbs 14 are formed between the enlarged end sections 11 and open-ended continuations 10a of the tube 10, which extend for some distance along inside sections 11. Annular glass spacers 15 support tube continuations 10a within the enlarged sections 11. Holes 16 establish communication between the interior of the bulbs 14 and the interior of the tube 10.

An electrode 17 in the form of a continuous metallic sleeve extends around the outside of the bulb 12, and two cooperating electrodes 18 (also consisting of metallic sleevs) are positioned around the bulbs 14. These electrodes are connected to a high frequency source 19, the electrodes 18 being connected to the grounded terminal of the source 19 through ballast resistors 20 which may be omitted if found unnecessary. The electrode 17 is connected to the active terminal of the source 19. The operating frequency is not critical to the invention and can be chosen to satisfy various practical requirements. Typically, a frequency anywhere in the range of 50 kilocycles to 30 megacycles can be chosen.

The laser is filled with a mixture of helium and neon in the ratio of about 7 to 1 to a pressure of approximately 1½ mm. of mercury, and the source 19 excites this gas in the usual way to promote laser action. The portions 10b of the tube 10 which project towards the ends of the device beyond the electrodes 18 tend to inhibit wandering of the high frequency energy towards the ends of the device and to confine the flow of such energy to the portion of the device between the two electrodes 18. The tube portions 10b achieve this object by virtue of their comparatively small diameter.

In the past, it has been usual to position all the electrodes directly around the small diameter tube 10 itself. It is a discovery of the present inventor that improved excitation of the laser is achieved by provision of the larger bulbs 12 and 14 communicating with the tube 10 and the mounting of the electrodes around such bulbs. It is necessary to have a comparatively small diameter for the laser tube 10 itself in order to ensure that contact with the tube walls will return sufficient neon atoms from an intermediate (or metastable) energy level to the zero energy level to maintain the required population ratios between the various levels. The use of the bulbs 12 and 14 allows the tube diameter to remain small, while ensuring that the laser contains more gas than would be possible in the same length of small diameter tube alone.

It has been found that the exciting power is better coupled into the laser when the electrodes 17 and 18 surround the larger diameter bulbs 12 and 14, instead of being mounted directly on the tube 10. The mechanism of this improved coupling and the consequent improved excitation is not fully understood, but the improvement is believed to flow principally from the increase in the ration between the diameter of a bulb 12 or 14 (in comparison with the tube 10) and the mean free path of electrons in these spaces. The bulbs 12 and 14 act in effect as electrodes themselves in transferring the high frequency energy into the laser, but they achieve this effect without the disadvantage of having a metal electrode located inside the glass envelope of the device.

Although the electrode structure has been shown in the FIG. 1 construction as comprising three electrodes, this is not essential, merely convenient. Any electrode structure that will excite the gas to laser action may be used, for example, two electrodes, as exemplified by the embodiment of FIG. 4, described below. If the energy is of sufficiently high frequency, a single electrode can couple with surrounding grounded objects to excite the gas. For efficiency, however, at least two electrodes are employed. In its broad scope the invention comprises associating one or more (but not necessarily all) of such electrodes with a bulb of larger diameter than the tube. It should be further mentioned that, although the bulbs have been shown surrounding the tube, this is not essential to their function. Each bulb could be disposed on one side of the tube, as far as function is concerned, although structurally such an arrangement would normally be less preferred.

In accordance with another feature of the invention each enlarged end section 11 is provided with a plug 21 which may conveniently be formed as a single piece of fused quartz and which comprises a flange 22 and a body 23 terminating in a slightly spherically concave surface (1 meter radius) on which a highly reflecting coating 24 is provided. The two reflecting coatings 24 at opposite ends of the device thus act to reflect coherent light back and forth along the tube 10 in the manner now known as laser action. The output from the laser is constituted by the small proportion of light that is not reflected by a selected one of the coatings 24 and is transmitted to the exterior through the associated plug body 23.

As best seen in FIG. 2 each plug 21 is secured in its enlarged end section 11 by a suitable vacuum-tight seal 25 which may be formed by fusing the glass or by cement or other known material for the purpose.

An alternative plug arrangement is shown in FIG. 3. Here the tube end section 11 is slightly curved inwardly (a natural effect of the application of heat by the glass blower) and then has formed on it an inner surface 26 which is conically ground to an inward taper symmetrical about the longitudinal axis of the device. This surface determines the alignment of the plug and it is easier to form such a conical surface with precision than it is to align a surface accurately prependicular to such axis. The plug 27 with a complementary conical surface 28 formed on it is then seated in the tube section 11. The outer surface 29 of the end section is also ground conically to make the glass very thin at the edge 30. This facilitates fusing the plug in place with a minimum of heat.

The elongated nature of the plugs 21 and 27 in the axial direction of the device serves to remove the sensitive coating 24 from the area of sealing of plug to tube. This avoids the coating being damaged by heat during the sealing process. It also removes the surface to which the coating is applied from the heated area, avoiding distortion from stresses set up during the sealing process. These advantages are most felt when the plug is fused in place, rather than cemented.

A particular advantage of the construction at each of the enlarged end sections 11 is that the reflector and the plug are formed as one member. In prior constructions of laser it has been customary to mount the reflector in the atmosphere outside the laser tube, which arrangement has had the disadvantage of exposing the reflector to risk of mechanical damage or impairment of its reflecting efficiency by particles of dust from the air. Also the need in prior constructions to transmit the laser energy through windows between the amplifying medium and the outside reflectors results in loss of energy which can seriously impair the functioning of the laser. Internal reflectors have been proposed in the past, but have not proved practicable, because they have suffered from the disadvantage of additional complexity and especially difficulties of alignment. These disadvantages have been overcome by the present contruction by forming the reflector surface on the sealing plug itself. The sealing plug is necessarily firmly fixed in the tube end and this avoids misalignment of the reflectors with the tube axis, the principal problem in the past, when the reflectors have been formed separately from the end plugs, In the present construction minor setting up adjustments to ensure accurately the necessary coaxial alignment of the tube bore 10 and the two reflectors 24 can be made, if necessary, by an external mount (sleeves 40) in which the laser is supported (FIG. 5), such mount including means 41 for very slightly flexing the device.

The alternative construction shown in FIG. 4 employs two bulbs 32 one at each end of the tube 10 with two cooperating metallic sleeve electrodes 18 positioned around respective bulbs 32 and connected across the high frequency source 19. Tube portions 10c project into the bulbs 32 and have the effect of shortening the overall length of the device for a given length of tube. The plugs 33 follow generally the construction shown in FIG. 3, being fused into tubular end sections 34 and each being provided with a reflecting coating 24 as before.

The FIG. 4 construction illustrates an additional novel feature by virtue of the provision of an extension 35 of each end section 34 inwardly of the associated bulb 32. These extensions 35 terminate at inturned rims 36 which define narrow openings 37 aligned with the longitudinal axis of the laser. The function of the extensions 35 with their associated rims 36 is to shield the coatings 24 as far as possible from damage or deterioration. Such deterioration has been observed in conventional lasers and it is postulated that it may be due to sputtering of quartz molecules from the internal surfaces of the bulbs and the impingement of such molecules on the coatings 24.

This feature of providing shielding for the end surfaces of the sealed envelope of the device is also applicable to the conventional type of laser in which the mirrors are externally mounted, as well as to the present arrangement where the mirror surfaces are formed on the plugs. When external mirrors are used, the end surfaces of the evacuated portion of the device consist of windows. It is important to retain the efficiency of light transmission of such windows at virtually 100%, for which reason even very minor damage to the surfaces may seriously impair or prevent operation of the device. The provision of shielding around the end surfaces thus has the effect of increasing the life of the device.

I claim:
1. A gaseous laser comprising:
 (a) a small diameter main straight plasma tube having an axis,
 (b) a pair of vacuum tight bulbs of larger diameter than said tube surrounding the same and secured thereto each at a respective end of said tube,
 (c) means establishing communication between the interior of each said bulb and the interior of said tube,
 (d) an active laser gaseous medium in said tube and said bulbs,
 (e) a pair of external excitation electrodes, each electrode extending around the exterior of a respective one of said bulbs for exciting said medium to produce stimulated emission,
 (f) a pair of tubular end sections secured each within a respective bulb and aligned with the axis of said main tube,
 (g) a plug in each said end section,
 (h) each said plug including a reflecting surface positioned inside the respective said end section and a peripheral surface symmetrical with respect to said axis for engaging a complementary surface in the end section that is symmetrical with respect to said axis, the pair of reflecting surfaces forming an optical resonant cavity along said axis,
 (i) a vacuum tight seal sealing each said peripheral surface to its respective said complementary surface, and
 (j) a mount supporting said laser tube and including means for slightly flexing said tube to achieve alignment of said reflecting surfaces with each other.

(References on following page)

References Cited

UNITED STATES PATENTS

| | | | |
|---|---|---|---|
| 3,170,383 | 2/1965 | Hunt | 98—1 |
| 3,319,183 | 5/1967 | Lempicki et al. | 331—94.5 |
| 2,162,505 | 6/1939 | James et al. | 313—112 |
| 3,396,343 | 8/1968 | Wesselink | 331—94.5 |
| 1,612,387 | 12/1926 | Machlett | 313—201 |
| 1,804,467 | 5/1931 | Hendry | 313—201 |

FOREIGN PATENTS 1,374,598  10/1963  France.

OTHER REFERENCES

Arecchi et al.: He-Ne Optical Masers, Alta Frequenza, pp. 718–134E, vol. XXXI, No. 11, November 1962.

RONALD L. WIBERT, Primary Examiner

R. J. WEBSTER, Assistant Examiner

U.S. Cl. X.R.

313—201